(12) United States Patent
Polson et al.

(10) Patent No.: US 7,734,568 B2
(45) Date of Patent: Jun. 8, 2010

(54) DVD METADATA WIZARD

(75) Inventors: Michael J. Polson, North Bend, WA (US); David W. Hostetter, Redmond, WA (US); Keith M. Toussaint, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 10/606,465

(22) Filed: Jun. 26, 2003

(65) Prior Publication Data

US 2004/0267742 A1 Dec. 30, 2004

(51) Int. Cl.
G06F 7/00 (2006.01)
(52) U.S. Cl. .................. 707/5; 707/2; 707/10; 707/102
(58) Field of Classification Search ............. 707/104.1, 707/100, 200, 101, 5, 10, 1, 2, 102
See application file for complete search history.

(56) References Cited

U.S. PATENT DOCUMENTS

| | | | | |
|---|---|---|---|---|
| 5,929,857 | A * | 7/1999 | Dinallo et al. ............... | 715/840 |
| 6,115,717 | A * | 9/2000 | Mehrotra et al. ............ | 707/102 |
| 6,138,175 | A * | 10/2000 | deCarmo ...................... | 710/5 |
| 6,356,914 | B1 * | 3/2002 | deCarmo et al. .......... | 707/104.1 |
| 6,429,879 | B1 * | 8/2002 | Sturgeon et al. ............ | 715/723 |
| 6,518,978 | B1 * | 2/2003 | Omata et al. ................. | 715/723 |
| 6,611,607 | B1 * | 8/2003 | Davis et al. .................. | 382/100 |
| 6,629,104 | B1 * | 9/2003 | Parulski et al. .............. | 707/102 |
| 6,684,207 | B1 * | 1/2004 | Greenfield et al. ............. | 707/3 |
| 6,701,478 | B1 * | 3/2004 | Yang et al. ................... | 714/757 |
| 6,708,334 | B1 * | 3/2004 | deCarmo et al. ............ | 718/106 |
| 6,760,721 | B1 * | 7/2004 | Chasen et al. .................. | 707/3 |
| 6,785,688 | B2 | 8/2004 | Abajian et al. | |
| 6,829,368 | B2 * | 12/2004 | Meyer et al. ................. | 382/100 |
| 6,850,252 | B1 * | 2/2005 | Hoffberg ..................... | 715/716 |
| 6,877,134 | B1 | 4/2005 | Fuller et al. | |
| 6,925,474 | B2 * | 8/2005 | McGrath et al. ......... | 707/104.1 |
| 6,941,324 | B2 * | 9/2005 | Plastina et al. ........... | 707/104.1 |
| 6,983,287 | B1 * | 1/2006 | Jayanti et al. ............... | 707/102 |
| 7,043,477 | B2 * | 5/2006 | Mercer et al. .................. | 707/7 |
| 7,051,019 | B1 * | 5/2006 | Land et al. ..................... | 707/4 |
| 7,054,888 | B2 * | 5/2006 | LaChapelle et al. ...... | 707/104.1 |
| 7,065,527 | B2 * | 6/2006 | McCartney et al. ........... | 707/10 |

(Continued)

OTHER PUBLICATIONS

Oetzel et al. U.S. Appl. No. 60/439,055.*

(Continued)

*Primary Examiner*—Hosain T Alam
*Assistant Examiner*—Leon Harper
(74) *Attorney, Agent, or Firm*—Lee & Hayes, PLLC

(57) ABSTRACT

Methods and systems are described that enhance a user's experience when playing a DVD through an enabled media player. One or more databases, managed by a server, maintain metadata associated with DVDs. When a DVD is loaded using the enabled media player, a DVD ID is automatically determined and used to search the metadata database. A user can confirm metadata that is found, causing the metadata to be stored in a local media library. Alternatively, the user can enter other search criteria to be used to locate different DVD metadata. Additionally, a user can either edit metadata that is returned from the metadata database, or manually enter metadata to be associated with a particular DVD. The user-edited or user-entered metadata can then be stored in the local media library.

10 Claims, 12 Drawing Sheets

U.S. PATENT DOCUMENTS

| | | | |
|---|---|---|---|
| 7,096,234 B2 * | 8/2006 | Plastina et al. | 707/104.1 |
| 7,116,894 B1 * | 10/2006 | Chatterton | 386/95 |
| 7,136,866 B2 * | 11/2006 | Springer et al. | 707/102 |
| 7,136,874 B2 * | 11/2006 | Mercer et al. | 707/104.1 |
| 7,159,000 B2 * | 1/2007 | Plastina et al. | 707/104.1 |
| 7,159,233 B2 * | 1/2007 | Son et al. | 725/86 |
| 7,171,018 B2 * | 1/2007 | Rhoads et al. | 382/100 |
| 7,194,527 B2 * | 3/2007 | Drucker et al. | 709/220 |
| 7,197,234 B1 * | 3/2007 | Chatterton | 386/95 |
| 7,206,853 B2 * | 4/2007 | Eytchison et al. | 709/230 |
| 7,212,574 B2 * | 5/2007 | Abrams et al. | 375/240.25 |
| 7,219,308 B2 * | 5/2007 | Novak et al. | 715/768 |
| 7,220,910 B2 * | 5/2007 | Plastina et al. | 84/615 |
| 7,224,819 B2 * | 5/2007 | Levy et al. | 382/100 |
| 7,447,815 B2 * | 11/2008 | Weaver et al. | 710/72 |
| 2003/0195863 A1 | 10/2003 | Marsh | |
| 2003/0233349 A1 | 12/2003 | Stern et al. | |
| 2004/0175159 A1 * | 9/2004 | Oetzel et al. | 386/125 |
| 2006/0150228 A1 * | 7/2006 | Kelly et al. | 725/109 |

OTHER PUBLICATIONS

Oetzel et al. U.S. Appl. No. 60/439,055, filed Jan. 2003.*
Music Match User Guide, retrieved on May 10, 2006 from <<http://web.archive.org/web/20021201102422/www.musicmatch.com/infouser_guide/mana...>>, Feb. 7, 2003, pp. 1-8.

* cited by examiner

Type the correct information, and then click Next.

* Title: How the Grinch Stole Christmas
Performer(s): Jim Carey; Anthony Hopkins; Jeffrey Tamb
Director: Ron Howard
Studio: Warner Home Video
Release Date: 2000-11-07
Genre: Children's Comedy / Children's Fantasy DVD Art Type the DVD information, and then click Next.
* = Required Field Chapters:    Insert  Delete

* 1. Logos / Main Title
2. Welcome Christmas!
3. Trim Up the Tree
4. Why Hate Holidays?
5. No More Noise
6. Phooey on Feasting
7. Stop that Singing Search    < Back    Next >    Cancel

602

If this information is correct, click Finish to update your Media Library.

Title: How the Grinch Stole Christmas
Performers: Jim Carey; Anthony Hopkins; Jeffrey Tambor; Christine Baranski
Director: Ron Howard
Studio: Warner Home Video
Release Date: 2000-11-07
Genre: Children's Comedy / Children's Fantasy DVD Art If this information is incorrect, click Search to search the media database, or click Edit to change existing information.

Chapters:
1. Logos / Main Title
2. Welcome Christmas!
3. Trim Up the Tree
4. Why Hate Holidays?
5. No More Noise
6. Phooey on Feasting
7. Stop That Singing!
8. An Awful Idea
9. You're a Mean One, Mr. Grinch
10. Max the Reindeer
11. Scary Sled Ride
12. Stealing From Stop #1
13. The Fiendish Finish
14. 10,000,000 Feet Up!
15. The Sound From Below
16. Christmas Still Came!

Search  Edit  < Back  Finish  Cancel

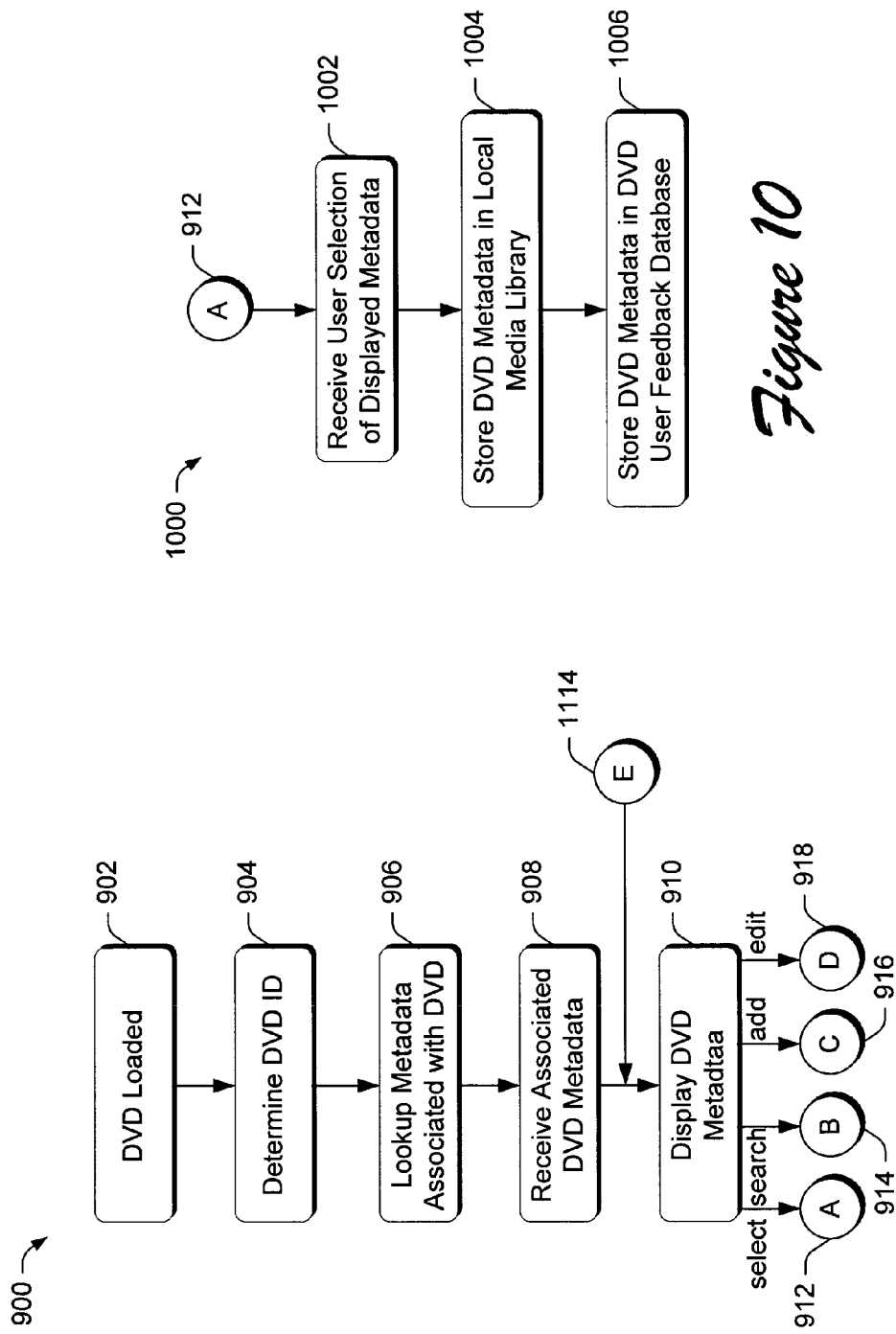

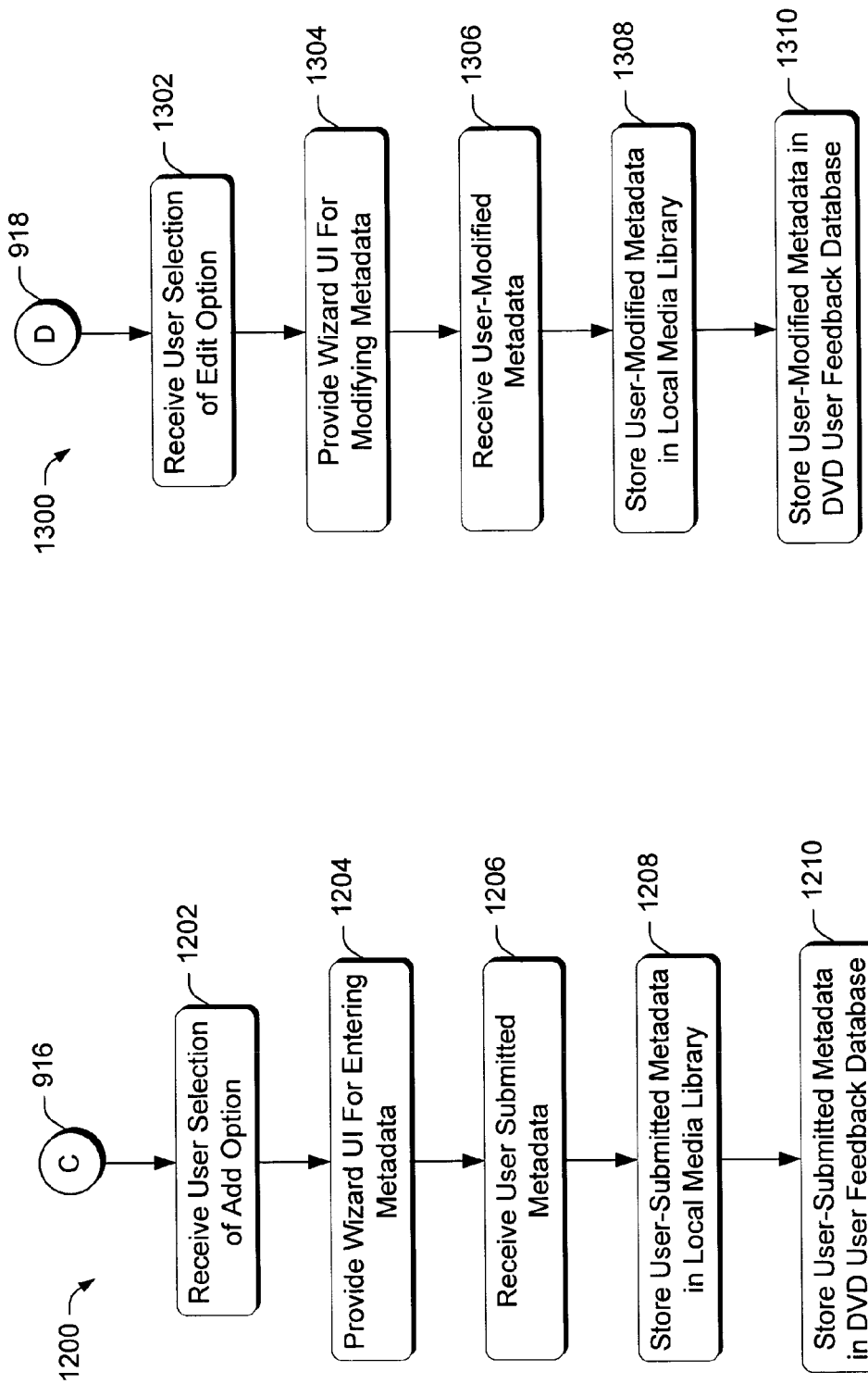

DVD METADATA WIZARD

TECHNICAL FIELD

This invention relates to providing a wizard to enable the acquisition, creation, or modification of DVD metadata.

BACKGROUND

With the technological advance of computers and the software that runs on computers, users are now able to enjoy many features, which just a few years ago, did not exist. For example, users can now play various media and multimedia content on their personal or laptop computers, thus providing an improved user experience. For example, most computers today are able to play compact discs (CDs) so that a user can listen to a favorite artist or artists while working on their computer. Additionally, many computers are equipped with a digital versatile disc (DVD) drive so that the user can watch movies on their personal computer.

As users become more used to advanced features on their computers, such as those mentioned above, their expectations of the various additional innovative features will undoubtedly continue to grow. For example, many systems enable a user to play a DVD, but a user may also be interested in viewing other information (referred to herein as "metadata") that is associated with a movie being played from a DVD.

SUMMARY

Methods and systems are described that greatly enhance the user experience when playing DVDs. One or more databases, managed by a server, maintain metadata associated with DVDs. The metadata can include any type of additional information that can be of interest to a user or consumer of the DVD media content.

In a described implementation, a DVD ID is generated from data stored on a DVD. The DVD ID is then used to retrieve and display metadata associated with the DVD ID from a DVD metadata database.

A user can accept the displayed metadata, modify the displayed metadata, or manually enter user-supplied metadata. The accepted, added, or edited metadata is then associated with the DVD ID and stored in a local media library. In an exemplary system, the metadata is also stored in a DVD user feedback database that can be used to update and/or verify the metadata stored in the DVD metadata database.

Additionally, if a user is not satisfied with metadata that is returned from the DVD ID metadata lookup, the user can submit search criteria (e.g., a portion of the DVD title) to identify a list of metadata sets that satisfy the search criteria, and therefore may be associated with the DVD. If the user selects one of the metadata sets that is returned based on the user-submitted search criteria, the metadata is associated with the DVD ID generated for the user's DVD, and stored in the user's local media library.

BRIEF DESCRIPTION OF THE DRAWINGS

FIG. 5 illustrates an exemplary DVD metadata entry screen display.

FIG. 6 illustrates an exemplary DVD metadata edit screen display.

FIG. 7 illustrates an exemplary DVD metadata confirmation screen display.

FIG. 9 is a flow diagram that illustrates a method for identifying metadata that may be associated with a particular DVD.

FIG. 10 is a flow diagram that illustrates a method for associating user-selected metadata with a particular DVD.

FIG. 12 is a flow diagram that illustrates a method for enabling a user to manually enter metadata to be associated with a particular DVD.

FIG. 13 is a flow diagram that illustrates a method for enabling a user to edit metadata to be associated with a particular DVD.

DETAILED DESCRIPTION

Overview

The embodiments described below provide methods and systems that enable a user or, more accurately, an enabled media player that is executing on a computing device or client, to access, retrieve, and display for a user, metadata that is associated with specific media content associated with a DVD that is being played using the media player. A search against a server-based DVD metadata database is performed, based on a DVD ID associated with the DVD currently being played, and the resultant metadata is returned to the user's computing device. If the resultant metadata is incorrect, a user is given the opportunity, through a Wizard user interface (UI) to perform another search, edit the metadata that was returned, or enter a set of metadata to be associated with the DVD. Furthermore, the enabled media player stores the retrieved metadata (or the metadata that is modified or entered by the user) in a local media library on the user's computer system, which can be easily accessed the next time the DVD is loaded into the system.

Various features of the described systems and methods include one or more databases, client side executable code, and a series of server side processes that provide for querying and maintaining the databases. One logical organization of an exemplary system includes the following: (1) a process to determine a DVD ID based on the content stored on a particular DVD, (2) a query process to retrieve information from a DVD metadata database based on the DVD ID, (3) a process to enable a user to submit search criteria to be used in a query for DVD metadata, (4) a query process to retrieve information from a DVD metadata database based on user-submitted search criteria, (5) a process to enable a user to edit metadata associated with a particular DVD, (6) a process to enable a user to manually enter metadata to be associated with a particular DVD, and (7) a process to update a local media library with metadata that a user identifies as being associated with a particular DVD.

The resultant system provides a user with the ability to access additional metadata and context-sensitive related data (e.g. title, chapters, performers, directors, studio, genre, DVD cover image, and the like) that may be associated with a particular DVD.

Exemplary Environment

Figure 1:
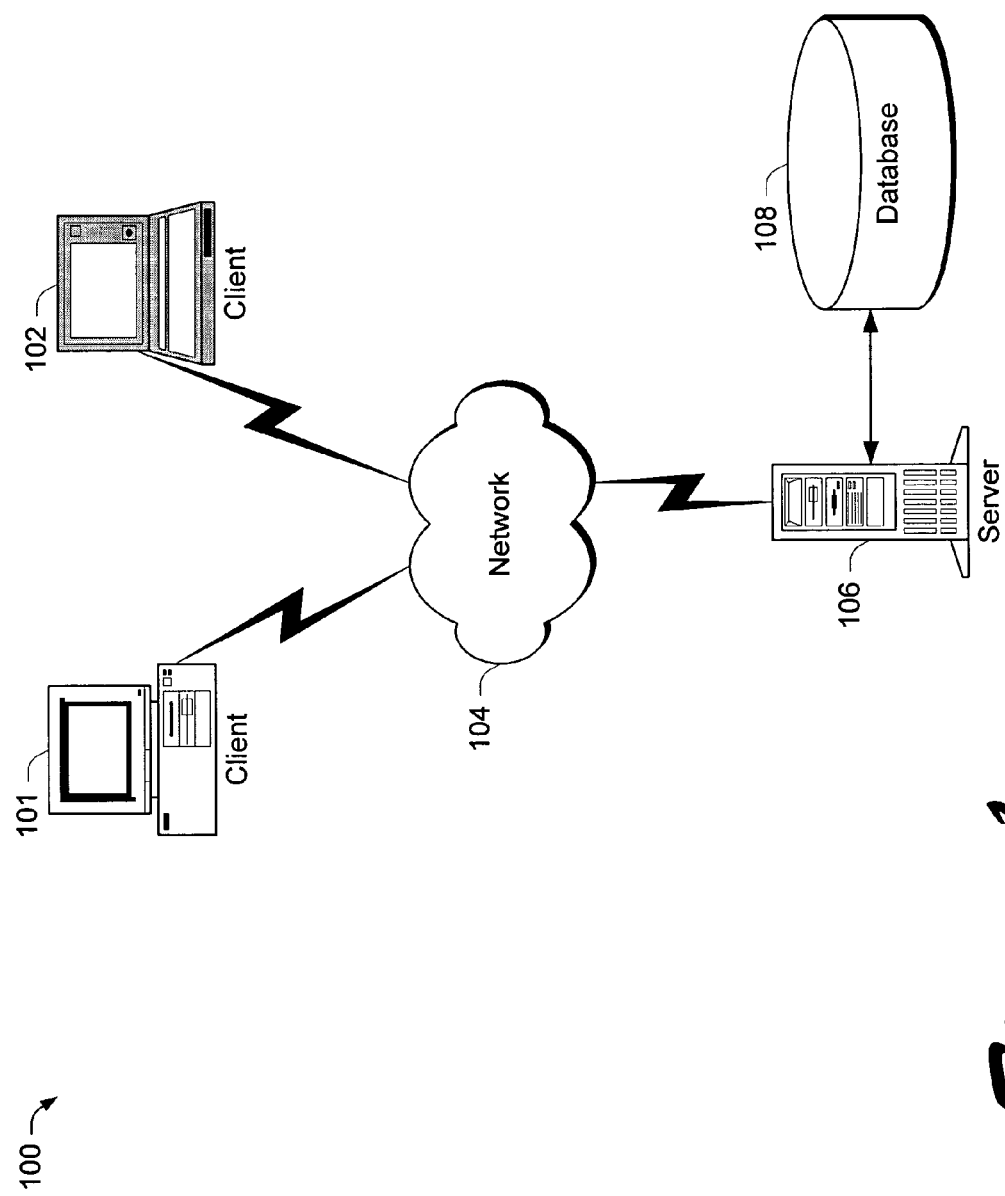
FIG. 1 is a diagram that illustrates an exemplary environment in which a DVD metadata Wizard user interface may be implemented.

FIG. 1 shows an exemplary environment 100 in which the embodiments described below can be implemented. The environment 100 includes one or more client computers—here 101, 102, a network 104, one or more server computers 106, and one or more databases 108. An exemplary network comprises the Internet, although any suitable network can be used.

In this environment, a user on the client side inserts a DVD into a DVD drive associated with the client computer, causing the DVD to be played using a media player application on the computer. A DVD ID is generated based on the media content stored on the DVD, and the DVD ID is then used to search a database 108 for associated metadata. If metadata is found that matches the submitted DVD ID, then the metadata is returned to the client via network 104 and displayed for the user. If the user indicates that the displayed metadata, is indeed, associated with the DVD, then based on a user selection, the metadata is stored in a local media library on the client computer system. If the user indicates that the displayed metadata is not associated with the DVD, then the user is given the ability (through a DVD Wizard UI) to either edit the displayed metadata or to manually enter new metadata to be associated with the DVD. Upon a user selection of a save command, the edited (or user-submitted) metadata is then stored in the user's local media library. If no metadata is found that matches the determined DVD ID, then the user is given the option to either enter search criteria to be used to attempt to find metadata associated with the user's DVD or to manually enter metadata to be associated with the DVD.

In an exemplary implementation, when user-modified or user-entered metadata is associated with a particular DVD and stored in a user's local media library, a copy of the metadata is also stored in a server-side user feedback metadata database. Although beyond the scope of this document, data stored in the user feedback metadata database may then be used to verify and/or update metadata stored in the server-side DVD metadata database.

The description below will provide detailed aspects of the above systems and various methods that all contribute to a much richer user experience.

Wizard

In an exemplary implementation, a series of user interface screens, referred to herein as a "Wizard", is provided to assist a user in identifying metadata associated with a DVD. The Wizard also enables a user to enter metadata associated with the DVD in the event that existing metadata associated with the DVD cannot be identified. The description below presents but one implementation of a Wizard that can be used to identify, edit, and/or create metadata to be associated with DVD media content.

Figure 2:
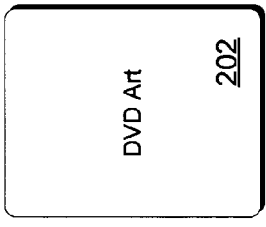
FIG. 2 illustrates an exemplary screen display of metadata identified as being associated with a particular DVD.

FIGS. 2-7 show select screens of an exemplary DVD Wizard user interface that can be provided in one implementation. In an exemplary implementation, the DVD Wizard user interface is implemented as a series of Active Server Pages (ASP) that collectively perform user driven metadata retrieval, query, and update functions for DVD metadata. FIG. 2 illustrates an exemplary DVD metadata screen 200 that is displayed on a client machine when metadata associated with a DVD currently being accessed by a media player is found. In an exemplary implementation, the DVD metadata is found through a query based on a DVD ID that is associated with the current DVD. In the illustrated example, metadata is displayed that includes DVD cover art 202, a title 204, a list of performers 206, a director 208, a studio 210, a release date 212, a genre 214, and a list of chapters 216.

If the displayed information is correct, a user can select the finish 11 button 218 to store the displayed metadata in a local media library that can easily be accessed the next time the same DVD is loaded into the user's computer system. On the other hand, if the displayed information is incorrect, the user can select the search button 220 to begin a DVD metadata search process, or the user can select the edit button 222 to edit the displayed DVD metadata.

Figure 3:
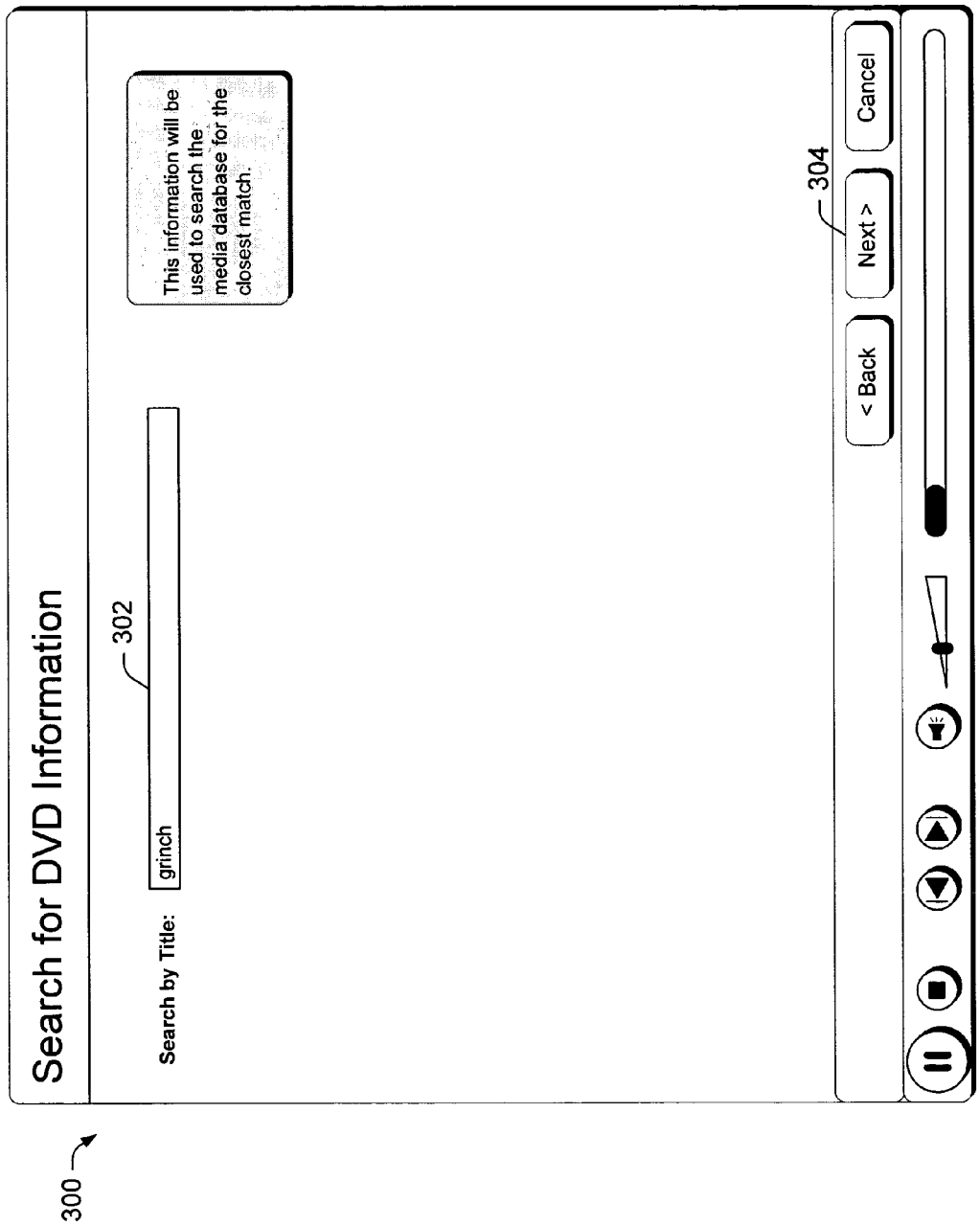
FIG. 3 illustrates an exemplary DVD metadata search screen display.

FIG. 3 illustrates an exemplary DVD metadata search screen 300 that is displayed on the user's client machine, for example, when the user selects the search button 220 shown in FIG. 2. DVD metadata search screen 300 displays a text entry box 302 where the user can enter all, or a portion of, the title of the DVD currently loaded in the client computer system. In the illustrated example, a user has entered the term, "grinch" as the title to be searched for. A DVD metadata query is submitted, for example, when the user selects the next button 304.

Figure 4:
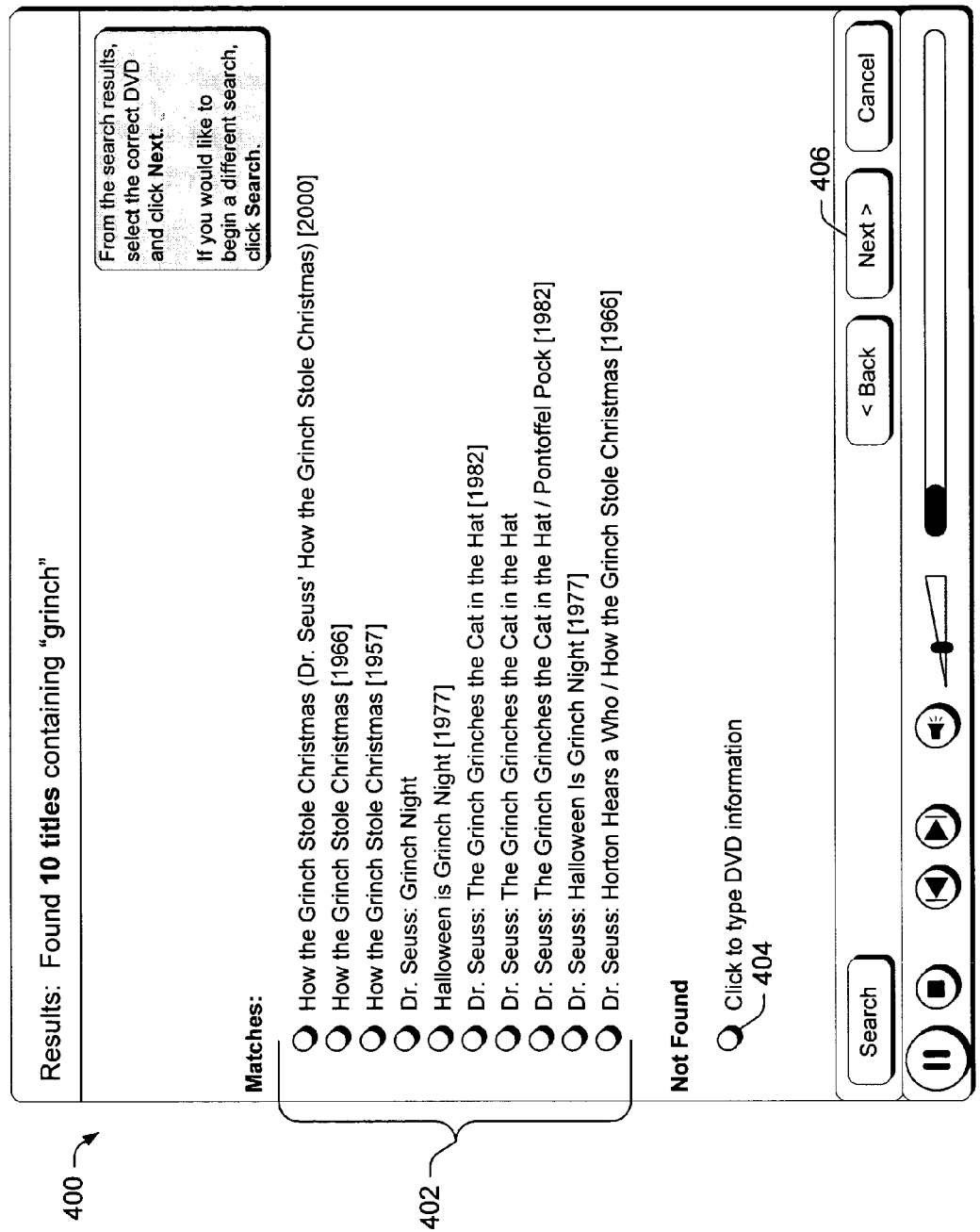
FIG. 4 illustrates an exemplary DVD metadata search results screen display.

FIG. 4 illustrates an exemplary search results screen 400 that is displayed on the user's client machine, for example, when the user enters search criteria and selects the next button 304, as illustrated in FIG. 3. In the illustrated implementation, search results screen 400 displays a list of DVD titles 402 that were found to match the user-submitted search criteria (i.e., "grinch" in the illustrated example). Search results screen 400 also displays a not found option 404 that can be selected if none of the displayed DVD titles 402 match the current DVD.

If the user selects one of the displayed matching titles in the list 402 and selects the next button 406, then the metadata associated with the selected DVD title is displayed in a DVD metadata confirmation screen 700 as described below with reference to FIG. 7. On the other hand, if the user selects the not found 11 option 404 and selects the next button 406, a DVD metadata entry screen is displayed to enable the user to manually enter metadata associated with the current DVD.

Figure 5:
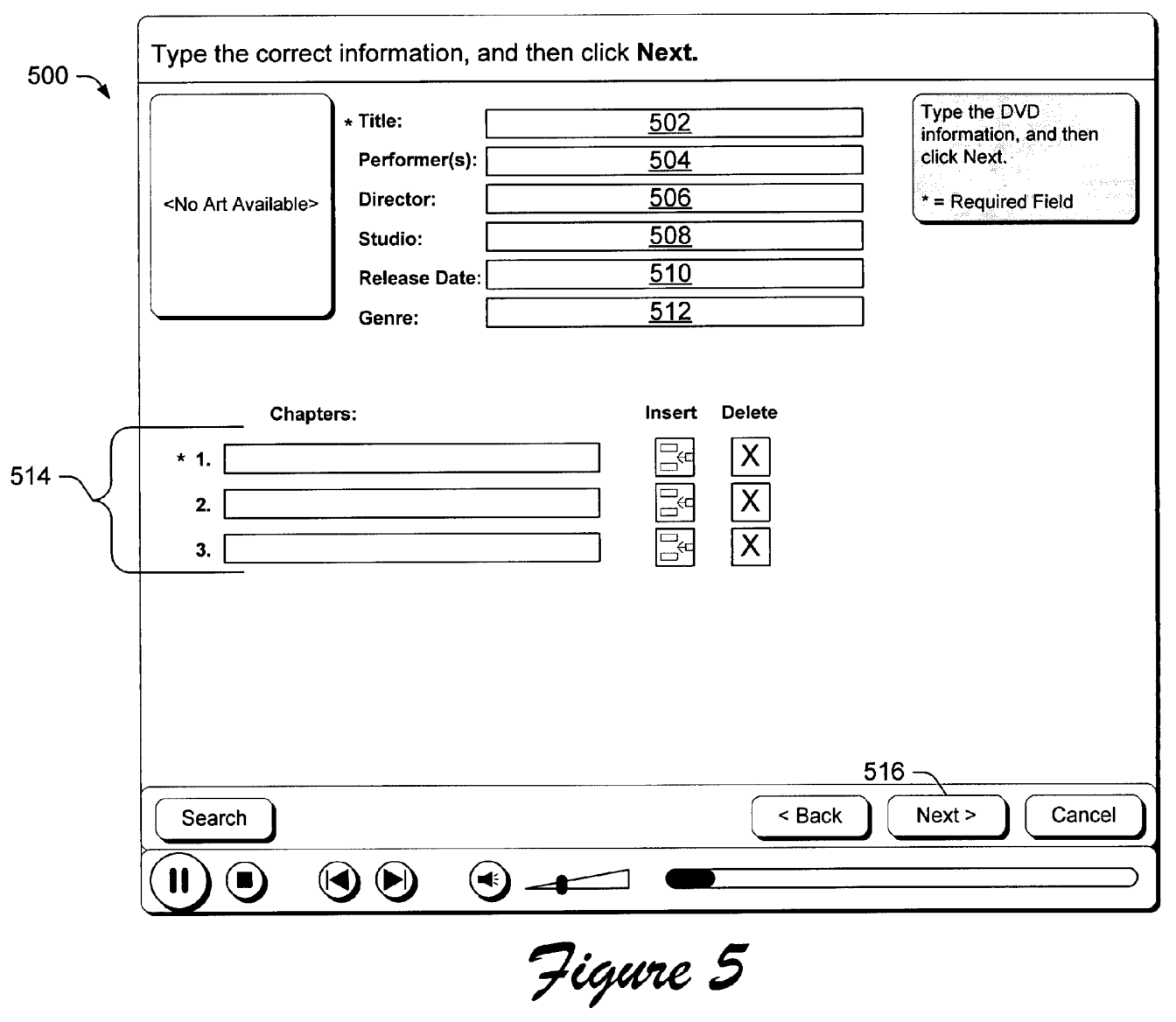

FIG. 5 illustrates an exemplary DVD metadata entry screen 500 that is displayed on the user's client machine, for example, when the user selects the not found option 404 and then selects the next button 406, as illustrated in FIG. 4. In the illustrated implementation, DVD metadata entry screen 500 displays a series of text entry boxes to enable the user to enter any known metadata to be associated with the current DVD. For example, in the illustrated example, DVD metadata entry screen 500 includes text entry boxes for entering a title 502, one or more performers 504, a director 506, a studio 508, a release date 510, a genre 512, and one or more chapters 514. In the illustrated example, the user is required to enter a title and at least one chapter. After the user enters the metadata to be associated with the DVD and selects the next button 516, the user-submitted data is displayed in a DVD metadata confirmation screen 700 as described below with reference to FIG. 7.

As described above with reference to FIG. 2, if the metadata that is displayed as a result of the initial search is incorrect, the user can select the search button 220 to begin a DVD metadata search process, or the user can select the edit button 222 to edit the displayed DVD metadata. FIG. 6 illustrates an exemplary edit screen 600 that may be displayed when a user selects, for example, the edit button 222, as illustrated in FIG. 2.

Edit screen 600 is similar to DVD metadata entry screen 500 (shown in FIG. 5), but instead of displaying blank fields to be filled in by the user, the edit screen 600 displays usermodifiable fields that are pre-populated with the metadata that was found during a search. For example, when accessed from DVD metadata screen 200 (shown in FIG. 2), the fields are pre-populated with the data displayed on the DVD metadata screen 200. A user can then edit any of the displayed metadata, and then select the next button 602, causing the user-modified metadata to be displayed in a DVD metadata confirmation screen 700 as described below with reference to FIG. 7.

FIG. 7 illustrates an exemplary DVD metadata confirmation screen 700 that is displayed on the user's client machine, after a user selects a particular title from a search results screen (as shown in FIG. 4), after a user manually edits metadata through the DVD metadata edit screen (as shown in FIG. 6), or after a user manually enters metadata through the DVD metadata entry screen (as shown in FIG. 5). DVD metadata confirmation screen 700 displays data similar to that shown in FIG. 2. However, when the user selects the finish button 702, in addition to storing the displayed metadata in a local media library, the selected, modified, or user-submitted metadata is also stored in a DVD user-feedback data repository.

DVD Metadata Wizard Process Flow

Figure 8:
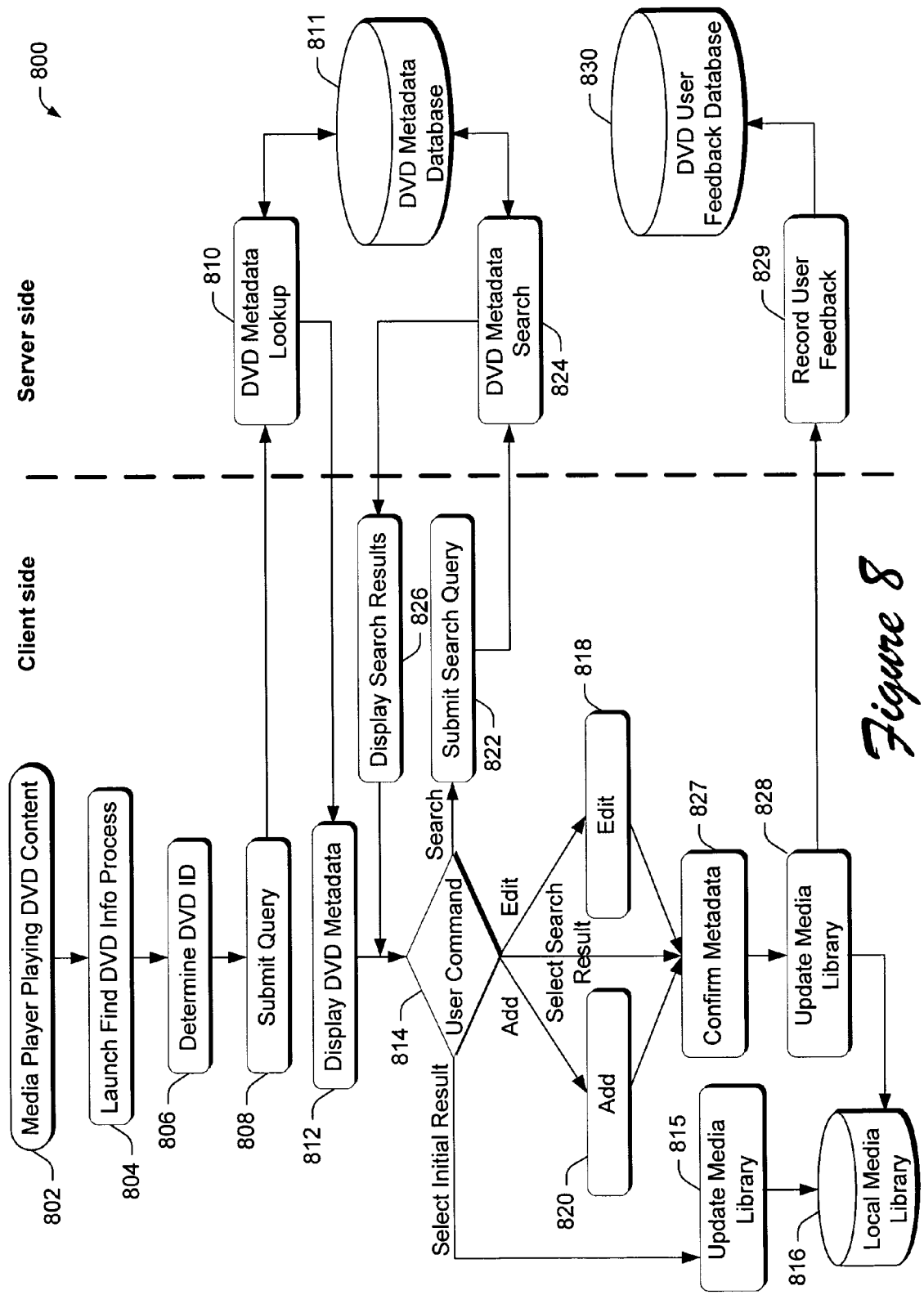
FIG. 8 is a flow diagram that illustrates processes performed as a result of user interaction with a DVD metadata Wizard user interface.

FIG. 8 is a flow diagram that illustrates user-driven metadata retrieval, query, and update functions for DVD metadata that may be performed by the described DVD metadata wizard. The illustrated process can be implemented in any suitable hardware, software, firmware or combination thereof. In the described implementation, the process is implemented in software. This software can reside on the server side of the system or on the client side of the system. In this particular example, portions of the software reside on both the server and 11 client sides of the system. To this extent, FIG. 8 is divided into two different sections—one labeled "Client side" to depict processing that occurs on the client side, and one labeled "Server side" to depict processing that occurs on the server side.

At block 802, a DVD is loaded in a DVD drive, and is being played using a media player on a client computer system.

At block 804, a find DVD information process is launched. In the described implementation, the find DVD information process is launched automatically by the media player when a DVD is loaded into the system. In an alternate implementation, the find DVD information process may be launched based on a user selection of a particular user interface object.

At block 806, a client side process determines a DVD ID associated with the current DVD. In an exemplary implementation, the DVD ID is a 64-bit cyclical redundancy check (CRC), which is generated, for example, as a check sum of bits of data contained on the DVD. In the described exemplary implementation, the DVD ID uniquely identifies the DVD and acts as a key into the DVD metadata database.

At block 808, the DVD ID is submitted to a server side query process to be used to lookup metadata associated with the DVD.

At block 810, the server side query process executes a query based on the submitted DVD ID against a DVD metadata database 811 that contains metadata associated with a plurality of DVDs. The results of the query are returned to the client computer system.

At block 812, if the query results contain metadata associated with a DVD ID that matches the submitted DVD ID, the metadata is displayed to the user, for example, as illustrated in FIG. 2. In an exemplary implementation, if no metadata is found that matches the submitted DVD ID, a screen may be displayed that includes a metadata not found message and selectable buttons that enable the user to either begin a search for metadata based on other search criteria (e.g., as described with reference to FIG. 3) or manually enter metadata associated with the DVD (e.g., as described with reference to FIG. 5.

At block 814, a user command is received. Exemplary user commands include a select initial result command, a search command, an edit command, and an add command. (A select search result command becomes available if search results are returned after a user submits a search command.)

At block 815, if a user enters a select initial result command, indicating that the metadata found based on the determined DVD is accurate, the user's local media library 816 is updated to include the selected metadata.

At block 818, if a user enters an edit command (e.g., by selecting the edit button 222 as illustrated in FIG. 2), an edit screen is displayed through which a user can modify the displayed DVD metadata. (An example edit screen is described above with reference to FIG. 6.)

At block 820, if a user enters an add command (e.g., by selecting the not found option 404 followed by the next button 406, as illustrated in FIG. 4), a DVD metadata entry screen is displayed through which the user can manually enter metadata to be associated with the DVD. (An example DVD metadata entry screen is described above with reference to FIG. 5.)

At block 822, if a user enters a search command (e.g., by entering data in text box 302 and selecting the next button 304, as illustrated in FIG. 3), the user-submitted search criteria is submitted to a server-side metadata search process.

At block 824, the server-side metadata search process performs a metadata search against the DVD metadata database 811, based on the user-submitted search criteria. Any metadata found that matches the query is then returned to the client system.

At block 826, results of the search are displayed to a user. For example, in the illustrated example implementation, a list of matching DVD titles and release years are listed, as illustrated in FIG. 4. Processing then continues at block 814, where the user can submit any of a number of user commands. In the exemplary example, after a user performs a search as described with reference to blocks 817-820, the select initial result command is no longer available, but a select search result command becomes available.

At block 827, after a user submits changes to the displayed metadata (described with reference to block 818), submits manually entered metadata (described with reference to block 820), or selects a result displayed based on a user-submitted search command (described with reference to blocks 822-826), the selected, added, or edited metadata is displayed to the user for final confirmation (as described above with reference to FIG. 7).

At block 828, when the user confirms the selected, added, or edited metadata (e.g., by selecting the finish button 702 shown in FIG. 7), a client side process is called to update a local media library 816 with the indicated DVD metadata.

At block 829, when metadata that is added, edited, or selected from search results is written to local media library 816, the metadata is also sent to a server side process that records the metadata, associated with the determined DVD ID in a server side DVD user feedback database 830. In alternate implementations, the DVD user feedback database 830 may be used by a server side process (not shown) to update or add DVD metadata to the DVD metadata database 811.

Exemplary DVD Metadata Wizard Methods

FIGS. 9-13 illustrate flow diagrams of methods for identifying metadata to be associated with a particular DVD. The described methods can be implemented in any suitable hardware, software, firmware or combination thereof. In the illustrated and described implementation, the methods are implemented in software. This software can reside on the server side of the system or on the client side of the system.

FIG. 9 illustrates a method 900 for identifying metadata that may be associated with a particular DVD.

At block 902, a DVD is loaded, for example, into a DVD drive of a client computer system. In an exemplary implementation, loading a DVD into a DVD drive causes the DVD to be played by a media player application associated with the client computer system.

At block 904, the system determines a DVD ID associated with the loaded DYD. In an exemplary implementation a 64-bit cyclical redundancy check (CRC) is generated based on data bits stored on the DVD. The DVD ID uniquely identifies the DVD and is used as a database key in a DVD metadata database.

At block 906, the DVD ID is submitted as a database key to lookup metadata associated with the DVD.

At block 908, provided metadata was found that matches the submitted DVD ID, the system receives the associated metadata. (In an event that no metadata is found that matches the DVD ID, then, although not illustrated, a "metadata not found" message may be displayed.) In an exemplary implementation, the identified metadata is formatted on a server system as an XML file and returned to the media player on the client system. Below is an example XML format that may be used to return the DVD metadata illustrated in FIG. 2:

```
<METADATA>
<MDR-DVD>
   <version>2.0</version>
   <dvdTitle>How the Grinch Stole Christmas</dvdTitle>
   <studio>Warner Home Video</studio>
   <leadPerformer>Jim Carey; Anthony Hopkins</leadPerformer>
   <actors>Jeffrey Tambor; Christine Baranski</actors>
   <director>Ron Howard</director>
   <MPAARating>NR</MPAARating>
   <releaseDate>2000-11-07</releaseDate>
   <genre>Comedy;Children's/Family;Fantasy Comedy;
   Children's Fantasy</genre>
   <largeCoverParams>
      dvdcover/cov150/drt000/t091/t09186csm0f.jpg
   </largeCoverParams>
   <smallCoverParams>
      dvdcover/cov075/drt000/t091/t09186csm0f.jpg
   </smallCoverParams>
   <dataProvider>AMG</dataProvider>
   <dataProviderParams>providerinfo/AMG/AMGRedir.asp</
   dataProviderParams>
   <dataProviderLogo>providerinfo/AMG/logo.gif</dataProviderLogo>
   <buyParams>
   dv_id=V%20%20%20163390&dvdTitle=
   How%20the%20Grinch%20Stole%20Christmas
   </buyParams>
   <moreInfoParams>dv_id=V%20%20%20163390</moreInfoParams>
   <title>
      <titleNum>1</titleNum>
      <titleTitle>How the Grinch Stole Christmas</titleTitle>
      <studio>Warner Home Video</studio>
      <director>Chuck Jones</director>
      <leadPerformer>Jim Carey;Anthony Hopkins</leadPerformer>
      <actors>Jeffrey Tambor;Christine Baranski</actors>
      <MPAARating>NR</MPAARating>
      <genre>Animation</genre>
      <providerRating>50</providerRating>
      <chapter>
         <chapterNum>1</chapterNum>
         <chapterTitle>Logos/Main Title</chapterTitle>
      </chapter>
      <chapter>
         <chapterNum>2</chapterNum>
         <chapterTitle>Welcome Christmas!</chapterTitle>
```

-continued

```
      </chapter>
      ... more chapters ...
   </title>
   ... more titles ...
</MDR-DVD>
</METADATA>
```

At block 910, the identified metadata is displayed to the user, for example, as illustrated and described above with reference to FIG. 2.

After the identified metadata is displayed, a user can submit any of a number of user commands. An exemplary set of user commands includes a select command, a search command, an add command, and an edit command. An exemplary select command is described below, with reference to FIG. 10, and is represented in FIG. 9 by block 912. An exemplary search command is described below, with reference to FIG. 11, and is represented in FIG. 9 by block 914. An exemplary add command is described below, with reference to FIG. 12, and is represented in FIG. 9 by block 916. An exemplary edit command is described below, with reference to FIG. 13, and is represented in FIG. 9 by block 918.

FIG. 10 illustrates an exemplary method performed in accordance with a user-submitted select command.

At block 1002, the media player receives an indication of a user-selection of displayed metadata. For example, a user may select the finish button 218, as illustrated in FIG. 2, to indicate that the user wants the displayed metadata to be associated with the current DVD.

At block 1004, the displayed metadata is stored in the user's local media library.

At block 1006, in an exemplary implementation, the displayed metadata is also stored in a DVD user feedback database (e.g. DVD user feedback database 830). In an exemplary implementation, the metadata is sent to a server in an XML format such as:

```
<MDU-DVD>
   <crc64>12345678</crc64>
   <transType>Add</transType>
   <volumeCount>1</volumeCount>
   <volumeNumber>1</volumeNumber>
   <discSide>2</discSide>
   <titleCount>15</titleCount>
   <titleRecordInfo>1,5,2,14,3,35,...</titleRecordInfo>
   <locale>en-us</locale>
   <version>9.0000.1234</version>
   <MDR-DVD>
      <version>2.0</version>
      <dvdTitle>How the Grinch Stole Christmas</dvdTitle>
      <studio>Warner Home Video</studio>
      <leadPerformer>Jim Carey; Anthony Hopkins</leadPerformer>
      <actors>Jeffrey Tambor;Christine Baranski</actors>
      <director>Ron Howard</director>
      <MPAARating>NR</MPAARating>
      <releaseDate>2000</releaseDate>
      <genre>Comedy;Children's/Family;Fantasy Comedy;
      Children's Fantasy</genre>
      <largeCoverParams>dvdcover/cov150/drt000/t091/
      t09186csm0f.jpg</largeCoverParams>
      <smallCoverParams>dvdcover/cov075/drt000/t091/
      t09186csm0f.jpg</smallCoverParams>
      <dataProvider>AMG</dataProvider>
      <dataProviderParams>providerinfo/AMG/AMGRedir.asp</
      dataProviderParams>
      <dataProviderLogo>providerinfo/AMG/logo.gif</dataProviderLogo>
      <buyParams>
         dv_id=V163390;dvdTitle=
```

-continued

```
        How%20the%20Grinch%20Stole%20Christmas
     </buyParams>
     <moreInfoParams>dv__id=V163390</moreInfoParams>
     <titleInfo>
        <titleNum>1</titleNum>
        <titleTitle>How the Grinch Stole Christmas</titleTitle>
        <studio>Warner Home Video</studio>
        <director>Chuck Jones</director>
        <leadPerformer>Jim Carey;Anthony Hopkins</leadPerformer>
        <actors>Jeffrey Tambor;Christine Baranski</actors>
        <MPAARating>NR</MPAARating>
        <genre>Animation</genre>
        <providerRating>50</providerRating>
        <communityRating>50</communityRating>
        <chapter>
           <chapterNum>1</chapterNum>
           <chapterTitle>Logos/Main Title</chapterTitle>
        </chapter>
        <chapter>
           <chapterNum>2</chapterNum>
           <chapterTitle>Welcome Christmas!</chapterTitle>
        </chapter>
    ... more chapters ...
     </titleInfo>
  ... more titles ...
  </MDR-DVD>
</MDU-DVD>
```

Figure 11:
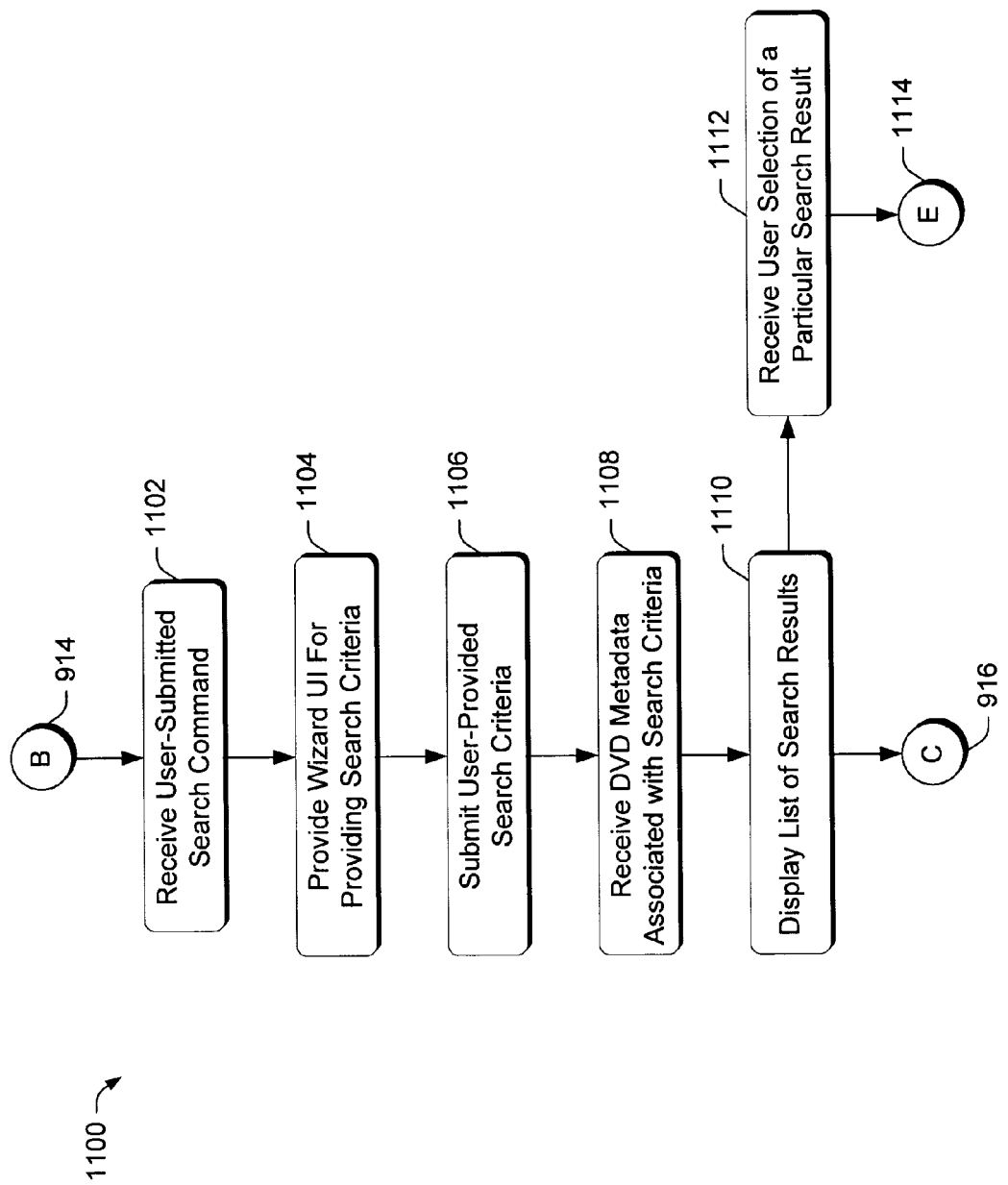
FIG. 11 is a flow diagram that illustrates a method for enabling a search of DVD metadata based on user-submitted search criteria.

FIG. 11 illustrates an exemplary method performed in accordance with a user-submitted search command.

At block 1102, the media player receives an indication of a user-submitted search command. For example, a user may select the search button 220, as illustrated in FIG. 2.

At block 1104, the system provides a Wizard user interface screen to enable the user to enter search criteria. For example, the display screen illustrated in FIG. 3 may be presented.

At block 1106, when the user submits search criteria (e.g., enters a DVD title and then selects the next button 304, as illustrated in FIG. 3), the user-provided search criteria is transmitted to, for example, a server-side metadata search process.

At block 1108, sets of metadata that match the provided search criteria is returned to the user, for example, as one or more XML files, as described above.

At block 1110, a list of search results is displayed. In an exemplary implementation, the DVD title and release year is extracted from each set of metadata that was returned (as describe above with reference to block 1108), and displayed, for example, as illustrated in FIG. 4.

If none of the displayed results are correct, the user can enter an add command (represented by block 916 of FIG. 9), for example, by selecting the not found option 404 and then selecting the next button 406, as illustrated in FIG. 4.

Alternatively, at block 1112, the system may receive an indication of a user selection of a particular displayed search result. For example, the user may select a radio button next to one of the displayed titles, and then select the next button 406, as illustrated in FIG. 4.

At block 1114, processing then continues as described above with reference to block 910 in FIG. 9.

FIG. 12 illustrates an exemplary method performed in accordance with a user-submitted add command.

At block 1202, the media player receives an indication of a user-submitted add command. For example, a user may select the not found option 404, and then select the search button 406, as illustrated in FIG. 4.

At block 1204, the system displays a DVD Wizard user interface that enables the user to manually enter metadata to be associated with the current DVD. For example, a display screen similar to the one illustrated in FIG. 5 may be displayed.

At block 1206, the system receives user-entered metadata. For example, the user may enter data in one or more text boxes on the add display screen, and then click the next button 516, as illustrated in FIG. 5.

At block 1208, the user-entered metadata is stored in the user's local media library.

At block 1210, in an exemplary implementation, the user-entered metadata is also stored in a DVD user feedback database (e.g. DVD user feedback database 830).

FIG. 13 illustrates an exemplary method performed in accordance with a user-submitted edit command.

At block 1302, the media player receives an indication of a user-submitted edit command. For example, a user may select the edit button 222, as illustrated in FIG. 2.

At block 1304, the system displays a DVD Wizard user interface that enables the user to edit the displayed metadata. For example, a display screen similar to the one illustrated in FIG. 6 may be displayed.

At block 1306, the system receives user-modified metadata. For example, the user may modify data in one or more text boxes on the edit display screen, and then click the next button 602, as illustrated in FIG. 6.

At block 1308, the user-modified metadata is stored in the user's local media library.

At block 1310, in an exemplary implementation, the user-modified metadata is also stored in a DVD user feedback database (e.g. DVD user feedback database 830).

Exemplary Computer System

Figure 14:
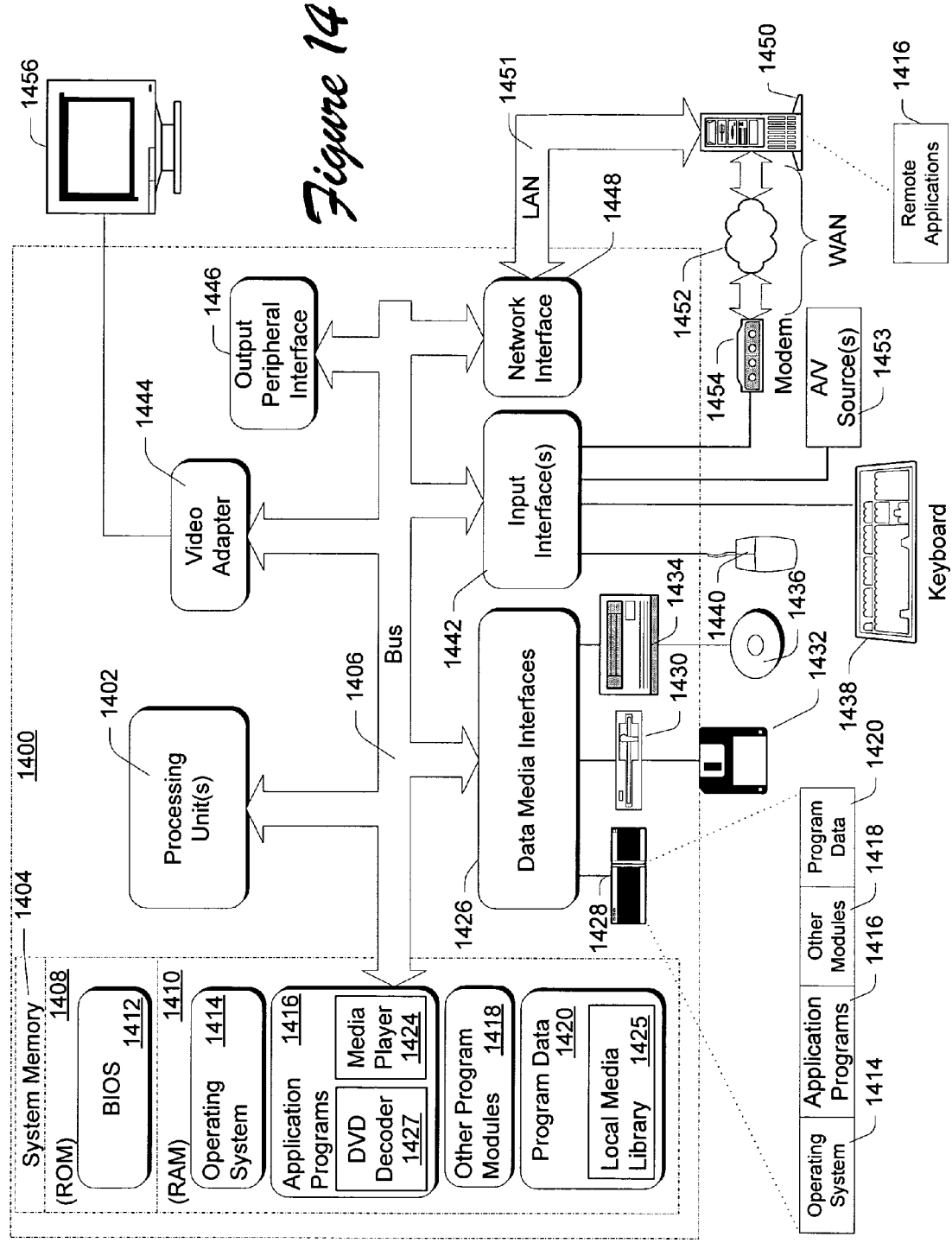
FIG. 14 is a block diagram that illustrates selected components of a computing environment in which a DVD metadata Wizard user interface can be implemented.

FIG. 14 illustrates an exemplary computing environment 1400 in which the inventive systems and methods described above can be implemented.

It is to be appreciated that computing environment 1400 is only one example of a suitable computing environment and is not intended to suggest any limitation as to the scope of use or functionality of the inventive embodiments described below. Neither should the computing environment 1400 be interpreted as having any dependency or requirement relating to any one or combination of components illustrated in the exemplary computing environment 1400.

The inventive techniques can be operational with numerous other general purpose or special purpose computing system environments or configurations. Examples of well known computing systems, environments, and/or configurations that may be suitable for use with the inventive techniques include, but are not limited to, personal computers, server computers, thin clients, thick clients, hand-held or laptop devices, multi-processor systems, microprocessor-based systems, set top boxes, programmable consumer electronics, network PCs, minicomputers, mainframe computers, distributed computing environments that include any of the above systems or devices, and the like.

In certain implementations, the inventive techniques can be described in the general context of computer-executable instructions, such as program modules, being executed by a computer. Generally, program modules include routines, programs, objects, components, data structures, etc. that perform particular tasks or implement particular abstract data types. The inventive techniques may also be practiced in distributed computing environments where tasks are performed by remote processing devices that are linked through a communications network. In a distributed computing environment, program modules may be located in both local and remote computer storage media including memory storage devices.

In the illustrated example, computing system 1400 includes one or more processors or processing units 1402, a system memory 1404, and a bus 1406 that couples various system components including the system memory 1404 to the processor 1402.

Bus 1406 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 1400 typically includes a variety of computer readable media. Such media may be any available media that is locally and/or remotely accessible by computer 1400, and it includes both volatile and non-volatile media, removable and non-removable media.

In FIG. 14, the system memory 1404 includes computer readable media in the form of volatile, such as random access memory (RAM) 1410, and/or non-volatile memory, such as read only memory (ROM) 1408. A basic input/output system (BIOS) 1412, containing the basic routines that help to transfer information between elements within computer 1400, such as during start-up, is stored in ROM 1408. RAM 1410 typically contains data and/or program modules that are immediately accessible to and/or presently being operated on by processing unit(s) 1402.

Computer 1400 may further include other removable/non-removable, volatile/non-volatile computer storage media. By way of example only, FIG. 14 illustrates a hard disk drive 1428 for reading from and writing to a non-removable, non-volatile magnetic media (not shown and typically called a "hard drive"), a magnetic disk drive 1430 for reading from and writing to a removable, non-volatile magnetic disk 1432 (e.g., a "floppy disk"), and an optical disk drive 1434 for reading from or writing to a removable, non-volatile optical disk 1436 such as a CD-ROM, DVD-ROM or other optical media. The hard disk drive 1428, magnetic disk drive 1430, and optical disk drive 1434 are each connected to bus 1406 by one or more interfaces 1426.

The drives and their associated computer-readable media provide nonvolatile storage of computer readable instructions, data structures, program modules, and other data for computer 1400. Although the exemplary environment described herein employs a hard disk 1428, a removable magnetic disk 1432 and a removable optical disk 1436, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 1428, magnetic disk 1432, optical disk 1436, ROM 1408, or RAM 1410, including, by way of example, and not limitation, an operating system 1414, one or more application programs 1416 (e.g., media player 1424 and DVD decoder 1427), other program modules 1418, and program data 1420 (e.g., local media library 1425). Some of the application programs can be configured to present a user interface (UI) that is configured to allow a user to interact with the application program in some manner using some type of input device. This UI is typically a visual display that is capable of receiving user input and processing that user input in some way. Such a UI may, for example, include one or more buttons or controls that can be selected by a user, using an input device such as a mouse. Media player application 1424 can be any suitable media player application that is configured to play any suitable media so that a user can experience the content that is embodied on the media. Two exemplary media player applications can include a CD media player application and a DVD media player application. Local media library 1425 can be any suitable data storage structure for storing metadata associated with media content that a user accesses through media player application 1424.

Continuing with FIG. 14, a user may enter commands and information into computer 1400 through input devices such as keyboard 1438 and pointing device 1440 (such as a "mouse"). Other input devices may include audio/video input device(s) 1453, a microphone, joystick, game pad, satellite dish, serial port, scanner, or the like (not shown). These and other input devices are connected to the processing unit(s) 1402 through input interface(s) 1442 that is coupled to bus 1406, but may be connected by other interface and bus structures, such as a parallel port, game port, or a universal serial bus (USB).

A monitor 1456 or other type of display device is also connected to bus 1406 via an interface, such as a video adapter 1444. In addition to the monitor, personal computers typically include other peripheral output devices (not shown), such as speakers and printers, which may be connected through output peripheral interface 1446.

Computer 1400 may operate in a networked environment using logical connections to one or more remote computers, such as a remote computer 1450. Remote computer 1450 may include many or all of the elements and features described herein relative to computer 1400.

As shown in FIG. 14, computing system 1400 can be communicatively coupled to remote devices (e.g., remote computer 1450) through a local area network (LAN) 1451 and/or a general wide area network (WAN) 1452. Such networking environments are commonplace in offices, enterprise-wide computer networks, intranets, and the Internet.

When used in a LAN networking environment, the computer 1400 is connected to LAN 1451 through a suitable network interface or adapter 1448. When used in a WAN networking environment, the computer 1400 typically includes a modem 1454 or other means for establishing communications over the WAN 1452. The modem 1454, which may be internal or external, and may be connected to the system bus 1406 via the input interface 1442, or other appropriate mechanism.

In a networked environment, program modules depicted relative to the personal computer 1400, or portions thereof, may be stored in a remote memory storage device. By way of example, and not limitation, FIG. 14 illustrates remote application programs 1416 as residing on a memory device of remote computer 1450. It will be appreciated that the network connections shown and described are exemplary and other means of establishing a communications link between the computers may be used.

CONCLUSION

The systems and methods described above can greatly enhance the user's media experience when they play a DVD using an enabled player. A robust collection of metadata is available for provision to the user through the use of a search process that enables a user to locate metadata associated with the DVD.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method implemented at least in part by a computing device, the method comprising:
   opening media content that is stored on a DVD;
   determining a DVD ID associated with the DVD;
   searching a database that contains DVD metadata based on the DVD ID;
   receiving an indication of a user request to search for DVD metadata based on search criteria other than the DVD ID;
   causing a user interface to be presented to the user to enable user submission of search criteria;
   receiving via the user interface, user-submitted search criteria;
   searching the database that contains DVD metadata based on the user-submitted search criteria;
   receiving one or more sets of DVD metadata that satisfy the user-submitted search criteria;
   displaying via the user interface, a list of identifiers associated with individual ones of the sets of DVD metadata;
   receiving via the user interface, an indication of a user selection of a particular identifier from the list of identifiers;
   displaying via the user interface, DVD metadata that is associated with the particular identifier;
   receiving via the user interface, an indication of a user's acceptance of the DVD metadata that is displayed; and
   storing the DVD metadata that is displayed, such that the DVD metadata is associated with the DVD ID in a local media library, wherein the local media library is maintained separate from the DVD.

2. The method as recited in claim 1, wherein the user-submitted search criteria comprises information pertaining to the DVD.

3. The method as recited in claim 1, wherein the user-submitted search criteria comprises at least a portion of a title associated with the DVD.

4. The method as recited in claim 1, wherein the searching comprises submitting the user-submitted search criteria to a server computer system.

5. The method as recited in claim 1, wherein individual ones of the one or more sets of DVD metadata each comprise:
   a DVD title; and
   a first chapter title.

6. The method as recited in claim 5, wherein the individual ones of the one or more sets of DVD metadata further comprise at least one of:
   DVD cover art;
   a performer name;
   a director name;
   a studio name;
   a release date;
   a genre; or
   a second chapter title.

7. The method as recited in claim 1, wherein a particular identifier in the list of identifiers comprises a DVD title.

8. The method as recited in claim 1, wherein a particular identifier in the list of identifiers comprises a DVD title and a release date.

9. The method as recited in claim 1, further comprising storing the DVD metadata that is displayed in a DVD user feedback data repository.

10. The method as recited in claim 9, wherein the storing comprises:
    formatting the DVD metadata that is displayed according to an XML schema; and
    transmitting formatted DVD metadata to a server computer system for storage in the user feedback data repository.

* * * * *